United States Patent Office 3,102,842
Patented Sept. 3, 1963

3,102,842
DIALKYL ALPHA-(TRIHALOPHENYL)-BETA-(HALO)-VINYL PHOSPHATES
Donald D. Phillips and Loyal F. Ward, Jr., Modesto, Calif., assignors to Shell Oil Company, New York, N.Y., a corporation of Delaware
No Drawing. Filed Mar. 19, 1962, Ser. No. 180,861
15 Claims. (Cl. 167—30)

This invention relates to a new class of phosphorus-containing esters which have been found to be particularly useful as insecticides.

Over the years, there has been an ever-increasing trend to "do it yourself." Consequently, there has been a corresponding increase in the number of homeowners, home gardeners, small truck gardeners, and small farmers who want to protect their plants from insects themselves, rather than hiring specialists to do it for them. None of these people is particularly skilled in the art of handling insecticide concentrates and the field sprays, in formulating field sprays from the concentrates, and in applying the sprays. They usually are reluctant to take the precautions—special clothing, face masks, goggles, etc.—required to protect them from the effects of an insecticide which contacts their skin, is inhaled or is blown into their eyes. There is, therefore, great need for compounds which will effectively kill insects, yet which are harmless to the persons handling and applying them who take ordinary precautions to avoid injury by the compound used. A further reason for the discovery and development of such insecticides is the fact that even professional applicators prefer materials which are innocuous to them, since it reduces the chance of their injury. Ordinarily, high insecticidal activity in a compound is accompanied by a high level of toxicity to mammals. The combination in one compound or class of compounds of a high insecticidal activity and low mammalian toxicity is rare, and few compounds have been found to possess it. This is abundantly evident when one compares the number of insecticides on the market which can be used with but ordinary precaution by the average person, and the number of materials which have been found to be insecticidally active and proposed as commercial insecticides. Patents alone disclose hundreds of insecticides which cannot be used by any but a skilled operator wearing special clothing and taking other precautions against injury by the insecticides.

There now has been discovered a class of compounds that are effective insecticides, yet which have outstandingly low mammalian toxicity. This class of compounds is described by the formula:

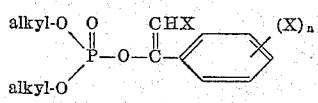

wherein each "alkyl" is an alkyl group of from 1 to 4 carbon atoms, each X is bromine or chlorine and $n$ is an integer from 3 to 5.

Referring to the halogen atoms bonded to the phenyl ring, they all may be the same, or they may be different, and they may be bonded at any combination of positions on the ring.

Compounds of this class wherein each "alkyl" group is methyl or ethyl, and at least one of the halogen atoms is bonded to the carbon atoms in the meta position of the phenyl ring, relative to the bond joining the ring to the indicated carbon atom of the phosphate structure, appear to have the highest insecticidal activity.

To illustrate and demonstrate the character of the compounds of this invention, and their nomenclature, the following species thereof are set forth:

Diethyl 2,4,5-trichloro-alpha-(chloromethylene)benzyl phosphate
Dimethyl 2,4,5-trichloro-alpha-(chloromethylene)benzyl phosphate
Dimethyl 2,4,5-trichloro-alpha-(bromomethylene)benzyl phosphate
Dimethyl 2,4,5-tribromo-alpha-(chloromethylene)benzyl phosphate
Dimethyl 2,4,5-tribromo-alpha-(bromomethylene)benzyl phosphate
Dimethyl 2,4,6-trichloro-alpha-(chloromethylene)benzyl phosphate
Diethyl 2,4,6-trichloro-alpha-(chloromethylene)benzyl phosphate
Dimethyl 2,4,6-tribromo-alpha-(chloromethylene)benzyl phosphate
Dipropyl 2,4,6-tribromo-alpha-(bromomethylene)benzyl phosphate
Dimethyl 2,4,6-trichloro-alpha-(bromomethylene)benzyl phosphate
Dimethyl 2,3,4-trichloro-alpha-(chloromethylene)benzyl phosphate
Diethyl 2,3,4-trichloro-alpha-(bromomethylene)benzyl phosphate
Dimethyl 2,3,4-tribromo-alpha-(chloromethylene)benzyl phosphate
Dimethyl 2,3,4-trichloro-alpha-(bromomethylene)benzyl phosphate
Dimethyl 3,4,5-trichloro-alpha-(chloromethylene)benzyl phosphate
Dimethyl 3,4,5-tribromo-alpha-(bromomethylene)benzyl phosphate
Dimethyl 3,4,5-trichloro-alpha-(bromomethylene)benzyl phosphate
Dimethyl 3,4,5-tribromo-alpha-(chloromethylene)benzyl phosphate
Dimethyl 2,3,4,5-tetrachloro-alpha-(chloromethylene)benzyl phosphate
Dimethyl 2,3,4,5-tetrabromo-alpha-(chloromethylene)benzyl phosphate
Dimethyl 2,3,4,5-tetrabromo-alpha-(bromomethylene)benzyl phosphate
Dimethyl 2,3,4,5-tetrachloro-alpha-(bromoethylene)benzyl phosphate
Diethyl 2,3,5,6-tetrachloro-alpha-(chloromethylene)benzyl phosphate
Dimethyl 2,3,5,6-tetrabromo-alpha-(chloromethylene)benzyl phosphate
Diethyl 2,3,4,6-tetrachloro-alpha-(chloromethylene)benzyl phosphate
Dimethyl 2,3,4,6-tetrabromo-alpha-(chloromethylene)benzyl phosphate
Dimethyl 2,3,4,5,6-pentachloro-alpha-(chloromethylene)benzyl phosphate
Dimethyl 2-chloro-4,5-dibromo-alpha-(chloromethylene)benzyl phosphate
Dimethyl 2-bromo-4,5-dichloro-alpha-(chloromethylene)benzyl phosphate
Dimethyl 2,3,5-trichloro-alpha-(chloromethylene)benzyl phosphate
Dimethyl 2,3,5-tribromo-alpha-(bromomethylene)benzyl phosphate
Dimethyl 4-bromo-2,5-dichloro-alpha-(bromomethylene)benzyl phosphate
Dimethyl 4-bromo-2,5-dichloro-alpha-(chloromethylene)benzyl phosphate
Dimethyl 4-bromo-2,3-dichloro-alpha-(bromomethylene)benzyl phosphate Dimethyl 4 - bromo - 2,3-dichloro-alpha-(chloromethylene)benzyl phosphate The compounds of this invention are readily prepared by reacting the appropriate trialkyl phosphite with the appropriate 2,2-dihaloacetophenone, according to the equation:

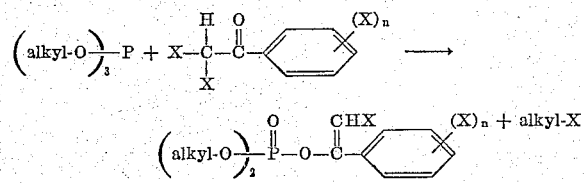

wherein each of the symbols has the respective meaning already set out herein.

The reaction of a trialkyl phosphite with an alpha-polyhalogeno ketone to give the corresponding vinyl phosphate is well known, being described in detail in U.S. Patents Nos. 2,956,073 and 3,003,916.

The trialkyl phosphites are well-known compounds.

The 2,2-dihaloacetophenones can be prepared by halogenating the appropriate acetophenones. Alternatively, the 2,2-dihaloacetophenones are prepared by an orthodox Friedel-Crafts ketone synthesis (described generally in Fieser and Fieser, "Organic Chemistry," second edition, 1950, at pages 576–7), by reacting the appropriate polyhalobenzene with the appropriate dihaloacetyl chloride in the presence of aluminum chloride, then decomposing the resulting complex with ice and hydrochloric acid.

The polyhalobenzenes are a well-known class of compounds, as are the dihaloacetyl chlorides—Huntress, "Organic Chlorine Compounds," Wiley, 1948.

The reaction is carried out as described in Fieser and Fieser—that is, the aluminum chloride is mixed with the polyhalobenzene, then the resulting mixture is mixed with the dihaloacetyl chloride, ordinarily at room temperature, the mixture is allowed to heat, or is heated to about 80–100° C., maintained at that temperature for a sufficient time to complete the formation of the complex, then the mixture is cooled and treated with an ice-hydrochloric acid mixture to decompose the complex and separate out water-soluble aluminum salts. About one mole of the acetyl chloride is used per mole of the polyhalobenzene, and ordinarily it will be found advantageous to use about a 10% excess of aluminum chloride, or about 1.1 moles per mole of the polyhalobenzene. Where the polyhalobenzene is liquid at room temperature, usually no added solvent will be required. Where the polyhalobenzene is solid at room temperature, or it is desired to maintain a more fluid mixture than can be obtained with the liquid polyhalobenzene alone, a solvent may be added, suitable solvents including carbon disulfide, nitrobenzene, nitromethane and the like.

The ketone product ordinarily is most effectively and conveniently recovered by treating the mixture obtained on decomposition of the complex with a suitable selective solvent, ether being suitable separating the organic phase from the aqueous phase, stripping the solvent from the organic phase, then distilling the residue to give the ketone product.

The preparation of the ketone precursors is illustrated by the following examples, in which "parts" means parts by weight unless otherwise designated, and "parts by weight" bear the same relation to "parts by volume" as does the kilogram to the liter.

EXAMPLE I

*Dimethyl 2,4,5-Trichloro-Alpha-(Chloromethylene) Benzyl Phosphate*

(A) *Preparation of 2,2,2',4',5' - pentachloroacetophenone.*—To 88 parts of aluminum chloride was added 109 parts of 1,2,4-trichlorobenzene. To this slurry, with stirring, was added 88 parts of dichloroacetyl chloride over a period of 10 minutes. The mixture then was heated slowly to 90° C. where it was held for 4 hours. Decomposition of the complex was effected by pouring the reaction mixture onto a mixture of ice and hydrochloric acid.

The resulting mixture was extracted with ether and the organic phase thus obtained was washed successively with dilute hydrochloric acid, water, dilute sodium bicarbonate solution and finally with saturated salt (NaCl) solution. The solvent was evaporated and the residue was distilled to give 134 parts (77% yield) of 2,2,2',4',5'-pentachloroacetophenone, a colorless liquid, boiling point 103–105° (0.05 torr), index of refraction ($n_D^{25}$): 1.5957. The identity of the product was confirmed by elemental analysis.

(B) *Preparation of Dimethyl 2,4,5-Trichloro-Alpha-(Chloromethylene)-Benzyl Phosphate.*—To 50 parts of 2,2,2',4',5'-pentachloroacetophenone was added, over one-half hour, 25.5 parts of trimethyl phosphite. The temperature was kept between 30° C. and 50° C. during the addition. After the addition was complete, the mixture was heated to 110° C. for one-half hour. The reaction mixture was then cooled to room temperature and treated with ether to induce crystallization. The crystals that formed were cooled in ice and filtered to give 46 parts of a first crop, melting point: 97–98° C. The mother liquors afforded 3 parts of a second crop on a similar treatment with ether and pentane to raise the total yield to 79%.

The identity of the product was confirmed by elemental analysis. The analysis (percent by weight) calculated for $PO_4Cl_4C_{10}H_9$: P, 8.5; Cl, 38.8. Actual analysis of product (percent by weight): P, 8.4; Cl, 38.9.

EXAMPLE II

*Diethyl 2,4,5-Trichloro-Alpha-(Chloromethylene)Benzyl Phosphate*

To 50 parts of 2,2,2',4',5'-pentachloroacetophenone (prepared as set out in Example I) was added, over one-half hour, 34 parts of triethyl phosphite. The temperature was kept between 35° C. and 55° C. during the addition. After the addition was complete, the mixture was heated to 100–110° C. for one-half hour and then cooled to room temperature. The mixture then was treated with 15 parts by volume of ether and 85 parts by volume of pentane and seeded with crystals that had been obtained by the crystallization of a small batch of the crude product. Chilling and filtration afforded 36 parts of a first crop of diethyl 2,4,5 - trichloro-alpha-(chloromethylene)-benzyl phosphate, melting point: 80–80.5° C. The mother liquors were stripped to 110° C. and 0.05 torr and treated with ether and pentane to obtain 9 parts of a second crop of the phosphate, melting point: 80–80.5 C. Total yield=67%. The identity of the product was confirmed by elemental analysis. The analysis (percent by weight) calculated for $PO_4Cl_4C_{12}H_{13}$: P, 7.9; Cl, 36.0; actual analysis of product (percent by weight): P, 8.3; Cl, 36.1.

EXAMPLE III

*Dimethyl 2,4,6-Trichloro-Alpha-(Chloromethylene) Benzyl Phosphate*

2,2,2',4',6'-pentachloroacetophenone was prepared from 1,3,5-trichlorobenzene and dichloroacetyl chloride as described in Example I for the preparation of 2,2,2',4',5'-pentachloroacetophenone, and was obtained as a colorless liquid, boiling point 108–110° C. (0.02 torr), index of refraction ($n_D^{25}$): 1.5823. The identity of the product was confirmed by elemental analysis.

To 41 parts of the pentachloroacetophenone was added 21 parts of trimethyl phosphite. The addition was made over a one-half hour period keeping the temperature between 75° C. and 85° C. The temperature then was raised to 100° C. for one-half hour and finally to 115–120° C. for one and one-half hours after adding 5 parts by volume of trimethyl phosphite. To the cooled solution pentane was added and crystalline dimethyl 2,4,6-trichloro-alpha-(chloromethylene)benzyl phosphate was obtained as two crops, melting point: 95–96° C.

Yield=35 parts (69%)

The identity of the product was confirmed by elemental analysis. The analysis (percent by weight) calculated for $C_{10}H_9PO_4Cl_4$: P, 8.5; Cl, 38.8. Actual analysis of the product (percent by weight): P, 8.6; Cl, 39.3.

EXAMPLE IV

*Diethyl 2,4,6-Trichloro-Alpha-(Chloromethylene)Benzyl Phosphate*

To 41 parts of 2,2,2',4',6'-pentachloroacetophenone was added 28 parts of triethyl phosphite. The addition was made over a one-half hour period, keeping the temperature between 75° C. and 80° C. by heating. The mixture then was heated to 110°–120° C. for one and one-half hours, 5 parts by volume of triethyl phosphite was added and the mixture was heated to 115–120° C. for one and one-half hours. The cooled solution was treated with pentane and crystalline diethyl 2,4,6-trichloro-alpha-(chloromethylene)benzyl phosphate was obtained as two crops, melting point: 67–68° C. Yield=37 parts (67%).

The identity of the product was confirmed by elemental analysis. The analysis (percent by weight) calculated for $C_{12}H_{13}PO_4Cl_4$ P, 7.9; Cl, 36.0. Actual analysis of the product (percent by weight): P, 8.1; Cl, 36.2.

EXAMPLE V

*Diethyl 2,4,5-Tribromo-Alpha-(Chloromethylene) Benzyl Phosphate*

2,2-dichloro-2',4',5'-tribromoacetophenone was obtained from 1,2,4-tribromobenzene and dichloroacetyl chloride in a manner similar to that described in Example I for preparation of 2,2,2',4',5'-pentachloroacetophenone. It was obtained as a dark brown liquid whose identity was confirmed by elemental analysis.

To 32 parts of 2,2-dichloro-2',4',5'-tribromoacetophenone was added 11.2 parts of trimethyl phosphite. The addition required one-half hour and cooling was necessary to keep the temperature below 55° C. The mixture then was heated to 100–110° C. for 15 minutes and at 100–120° C. for 45 minutes. The cooled mixture solidified and was recrystallized from ether/pentane to give 22.5 parts (60%) of dimethyl 2,4,5-tribromo-alpha-(chloromethylene)benzyl phosphate as a buff-colored solid, melting point: 130–130.5° C.

The product was identified by elemental analysis. The analysis (percent by weight) calculated for $$C_{10}H_9Br_3ClPO_4$$

P, 6.2; Cl, 7.1. Actual analysis of the product (percent by weight): P, 6.3; Cl, 7.4.

EXAMPLE VI

*Diethyl 2,4,5-Tribromo-Alpha-(Chloromethylene)Benzyl Phosphate*

Diethyl 2,4,5-tribromo-alpha-(chloromethylene)benzyl phosphate was prepared from 15 parts of triethyl phosphite and 32 parts of 2,2-dichloro-2',4',5'-tribromacetophenone in the manner described in Example V to obtain diethyl 2,4,5-tribromo-alpha-(chloromethylene)benzyl phosphate in 63% yield, melting point: 99–100° C.

The product was identified by elemental analysis. The analysis (percent by weight) calculated for $$C_{12}H_{13}PO_4Br_3Cl$$

P, 5.9; Cl, 6.7; Br, 45.5. Actual analysis of the product (percent by weight) P, 5.9; Cl, 7.1; Br, 44.8.

EXAMPLE VII

*Dimethyl 2,3,4-Trichloro-Alpha-(Chloromethylene) Benzyl Phosphate*

2,2,2',3',4' - pentachloroacetophenone was obtained from 1,2,3-trichlorobenzene, dichloroacetyl chloride and aluminum chloride in a manner similar to that described for preparation of the 2',4',5'-isomer in Example I, and was obtained as a colorless oil, boiling point 103° C. (0.06 torr). Index of refraction ($n_D{}^{25}$): 1.5965. The identity of the product was confirmed by elemental analysis.

To 50 parts of the 2,2,2',3',4'-pentachloroacetophenone was added 25 parts of trimethyl phosphite. The addition was made over one-half hour at 65–75° C. (cooling necessary). The mixture was heated to 110° C. for one hour, stripped at 120° C. (0.5 torr) and the solid that precipitated on cooling was crystallized from pentane to obtain 41.5 parts (67%) of dimethyl 2,3,4-trichloro-alpha-(chloromethylene)benzyl phosphate as colorless needles, melting point 67.5–68.0° C.

The identity of the product was confirmed by elemental analysis. The analysis (percent by weight) calculated for $C_{10}H_9PO_4Cl_4$: P, 8.5; Cl, 38.8. Actual analysis of the product (percent by weight): P, 8.5; Cl, 39.0.

EXAMPLE VIII

*Diethyl 2,3,4-Trichloro-Alpha-(Chloromethylene) Benzyl Phosphate*

Diethyl 2,3,4-trichloro-alpha-(chloromethylene)benzyl phosphate was prepared from 50 parts of 2,2,2',3',4'-pentachloroacetophenone and 34 parts of triethyl phosphite as described for the preparation of the dimethyl analog in Example VII and was obtained in 54% yield as a crystalline solid, melting point: 29–30° C.

The identity of the product was confirmed by elemental analysis. The analysis (percent by weight) calculated for $C_{12}H_{13}PO_4Cl_4$: P, 7.9; Cl, 36.0. Actual analysis of the product (percent by weight): P, 8.1; Cl, 36.3.

The corresponding alpha-bromomethylene analogs of these compounds are prepared by substituting the corresponding 2,2-dibromoacetophenone precursors, prepared from 2,2-dibromoacetyl chloride and a suitably substituted acetophenone, or by brominating the latter.

Compounds of this invention are effective insecticides, being active against a variety of insects, stable on storage, non-phytotoxic at insecticidally effective dosages, having very low toxicity to mammals.

By the term "insects" is meant not only the members of the class Insecta, but also related or similar invertebrate animal organisms belonging to the allied classes of arthropods and including ticks, mites, spiders, wood lice and the like.

The effectiveness of compounds of this invention as insecticides is demonstrated by the following experiments and the results thereof.

In the interest of brevity, in the following examples, the species of the compounds of the invention will be referred to by letter, as follows:

Compound A: Compound of Example IB
Compound B: Compound of Example II
Compound C: Compound of Example III
Compound D: Compound of Example IV
Compound E: Compound of Example V
Compound F: Compound of Example VI

EXAMPLE IX

Solutions of certain of the novel compounds of the invention were made up employing either a neutral petroleum distillate boiling within the kerosene range or acetone as the solvent. The solutions were tested for toxicity against the pea aphid, *Macrosiphum pisi*, by spraying groups of plants infested with the insects under controlled conditions which varied from one test to the other only with respect to the identity of the toxic agent and its concentration. Thus, in each of the several tests, the same total volume of spray was used. Also, tests were carried out using the common housefly, *Musca domestica*, as the test insect, the method used being that described by Y. P. Sun, Journal of Economic Entomology, volume 43, pp. 45 et seq. (1950). Table I shows the concentration of toxic agent in the sprayed solution required to cause 50 percent mortality of the test insect—i.e., the $LC_{50}$ concentration. The activity of compounds of the invention with respect to the corn earworm, *Heliothis zea*, was determined by caging corn earworm larvae on cut broad bean plants inserted in water after formulations of the test compounds, prepared by dissolving acetone solutions of the compounds in water, had been sprayed thereon. Two replicates were used with each test, various tests being directed to different concentrations of the test compounds in the liquid formulations. The $LC_{50}$ values are set out on Table I. The activity of compounds of the invention with respect to the rice weevil, *Sitophilus oryza*, was determined by pouring a measured amount of a solution of the test compound over adult rice weevils in a container having a perforated bottom, excess solution immediately draining away. Ten seconds after the solution had been poured on the weevils, the weevils were dried with blotter paper, transferred to containers and held in a controlled temperature and humidity room for 24 hours. Counts then were made to determine the number of weevils killed (which included moribund weevils). Several replicates were conducted, several concentrations of the test compound in the solution being used at each concentration. Table I sets out the $LC_{50}$ concentrations of compounds of the invention with respect to these weevils. The activity of compounds of the invention with respect to the western spotted cucumber beetle, *Diabrotica undecimpunctata* was determined in a similar manner: second instar larvae of this beetle were treated with solutions of the test compounds, immediately dried by blotting, then held for 24 hours, after which the mortality was determined. Table I sets out the $LC_{50}$ concentrations of compounds of the invention with respect to these beetles.

TABLE I.—MEDIAN LETHAL CONCENTRATION ($LC_{50}$)
[Grams per 100 milliliters solvent]

| Test Material | Test Insect | | | | |
|---|---|---|---|---|---|
| | Pea aphid | Housefly | Corn earworm | Western spotted cucumber beetle | Rice weevil |
| Compound A | | 0.010 | 0.0066 | 0.0013 | 0.005 |
| Compound B | | 0.012 | 0.0083 | 0.0010 | 0.006 |
| Compound C | 0.0054 | 0.044 | | | |
| Compound D | | 0.047 | | | |
| Compound E | | 0.0215 | | | |
| Compound F | | 0.031 | | | |
| Compound G | 0.09 | 0.0275 | | | |
| Compound H | 0.045 | 0.056 | | | |

It was found that compounds C and D very rapidly immobilized the flies—i.e., they exhibited a high "knockdown" rate.

EXAMPLE X

During the conduct of these insecticidal tests, there was observed no phytotoxicity of the insecticides at the concentrations used.

EXAMPLE XI

It has been found that the acute oral mammalian toxicity ($LD_{50}$ in milligrams per kilogram of body weight, male mice) of compounds of the invention are very low, the toxicities of Compounds A and B, for example, being greater than 2000.

Compounds of this invention can be employed for insecticidal purposes by the use of any of the methods which are conventionally employed in the art. For example, the compounds can either be sprayed or otherwise applied in the form of a solution or dispersion, or they can be absorbed on an inert, finely divided solid and applied as a dust. Useful solutions for application by spraying, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ and $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the insecticides of the present invention can be employed as aerosols, as by dispersing the same into the atmosphere by means of a compressed gas.

The concentration of the insecticides to be used with the above carriers is dependent upon many factors, including the particular insecticide utilized, the carrier employed, the method and conditions of application, and the insect species to be controlled, a proper consideration and resolution of these factors being within the skill of those versed in the insecticide art. In general, however, the insecticide compounds of this invention are effective in concentrations of from about 0.01 to 0.5% based upon the total weight of the composition, though under some circumstances as little as about 0.00001% or as much as 2% or even more the compound can be employed with good results from an insecticidal standpoint, as wherein high concentrations of active material are used in low-volume sprays or dusts.

When employed as an insecticide, a compound of this invention can be employed either as the sole toxic ingredient or the insecticidal composition, or it can be employed in conjunction with the other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, azobenzene, dimethyl 2,2-dichlorovinyl phosphate, dimethyl 1,2-dibromo-2,2-dichloroethyl phosphate, and the various compounds of arsenic, lead and/or fluorine.

Because of their physical properties, and the combination of their effective insecticidal action, stability and very low mammalian toxicity, compounds of this invention are useful for applications for which many otherwise effective insecticides cannot be used. Included in such applications are: (1) control of both ectoparasites on and endoparasites in warm-blooded animals; (2) control of insects in soil; (3) control of insects attacking trees, as by application of the insecticide on and/or into the tree; (4) control of insects in stored products in granaries and warehouses; (5) use as fumigants or space sprays in control of insects in public places, such as restaurants, airplanes, busses, offices, markets and the like; (6) use to control insects in and around the home. Doubtless there can be readily visualized other applications for which a stable, highly active insecticide of very low mammalian toxicity would be ideal.

We claim as our invention:

1. A phosphorus ester of the formula:

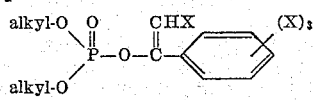

wherein each "alkyl" represents an alkyl group of from 1 to 4 carbon atoms, each X represents a member of the group consisting of bromine and chlorine.

2. A phosphorus ester defined in claim 1 wherein both of "alkyl" are methyl.

3. A phosphorus ester defined in claim 1 wherein both of "alkyl" are ethyl.

4. Dimethyl 2,4,5 - trichloro-alpha-(chloromethylene) benzyl phosphate.

5. Diethyl 2,4,5-trichloro-alpha-(chloromethylene)benzyl phosphate.

6. A method for controlling insects which comprises subjecting the insects to the effect of a compound of claim 1.

7. A method for controlling insects which comprises subjecting the insects to the effect of a compound of claim 2.

8. A method for controlling insects which comprises subjecting the insects to the effect of a compound of claim 3.

9. A method for controlling insects which comprises subjecting the insects to the effect of a compound of claim 4.

10. A method for controlling insects which comprises subjecting the insects to the effect of a compound of claim 5.

11. An insecticidal composition comprising an inert carrier and as an insecticidally active material a phosphorus ester of the formula:

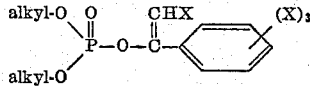

wherein each "alkyl" represents an alkyl group of from 1 to 4 carbon atoms, each X represents a member of the group consisting of bromine and chlorine.

12. An insecticidal composition comprising an inert carrier and as an insecticidally active material a compound of claim 2.

13. An insecticidal composition comprising an inert carrier and as an insecticidally active material a compound of claim 3.

14. An insecticidal composition comprising an inert carrier and as an insecticidally active material a compound of claim 4.

15. An insecticidal composition comprising an inert carrier and as an insecticidally active material a compound of claim 5.

References Cited in the file of this patent

UNITED STATES PATENTS

| | | |
|---|---|---|
| 2,956,073 | Whetstone et al. | Oct. 11, 1960 |
| 3,003,916 | Gilbert et al. | Oct. 10, 1961 |
| 3,027,296 | Whetstone et al. | Mar. 27, 1962 |

FOREIGN PATENTS

| | | |
|---|---|---|
| 941,972 | Germany | Apr. 26, 1956 |
| 783,697 | Great Britain | Sept. 25, 1957 |